(No Model.) 2 Sheets—Sheet 2.

W. S. RICHARDS.
AUTOMATIC BATTERY CUT-OFF.

No. 482,136. Patented Sept. 6, 1892.

WITNESSES
INVENTOR
W. S. Richards
ATTORNEYS

UNITED STATES PATENT OFFICE.

WALTER S. RICHARDS, OF NATICK, ASSIGNOR OF ONE-HALF TO GEORGE B. JAMES, OF BOSTON, MASSACHUSETTS.

AUTOMATIC BATTERY CUT-OFF.

SPECIFICATION forming part of Letters Patent No. 482,136, dated September 6, 1892.

Application filed January 3, 1891. Serial No. 376,645. (No model.)

*To all whom it may concern:*

Be it known that I, WALTER S. RICHARDS, of Natick, in the county of Middlesex and State of Massachusetts, have invented certain new and useful Improvements in Automatic Battery Cut-Offs, of which the following is a specification.

This invention has for its object to prevent interference with the proper working of telegraph fire-alarms and other electric lines by disturbances occasioned by the weather and other causes tending to prevent the armatures of the instruments included in the line from properly separating or falling away from the poles of the relays when the circuit is opened. Usually the operators at the ends of a line are practical and skilled in keeping their instruments in proper adjustment and experience no difficulty in keeping them adjusted to sudden fluctuations of current; but at intermediate offices less skillful operators are frequently employed.

The particular object of my invention, therefore, is to provide means which, in connection with the properly-adjusted instruments at the ends of a line, will insure the momentary short-circuiting of the current on the main line and the consequent release of all intermediate relay-armatures whenever from any cause—such as a "weather-cross" or a "ground" on the main line—the main-line circuit is interfered with.

To this end my invention consists in the improvements as hereinafter described and claimed.

Figure 1:
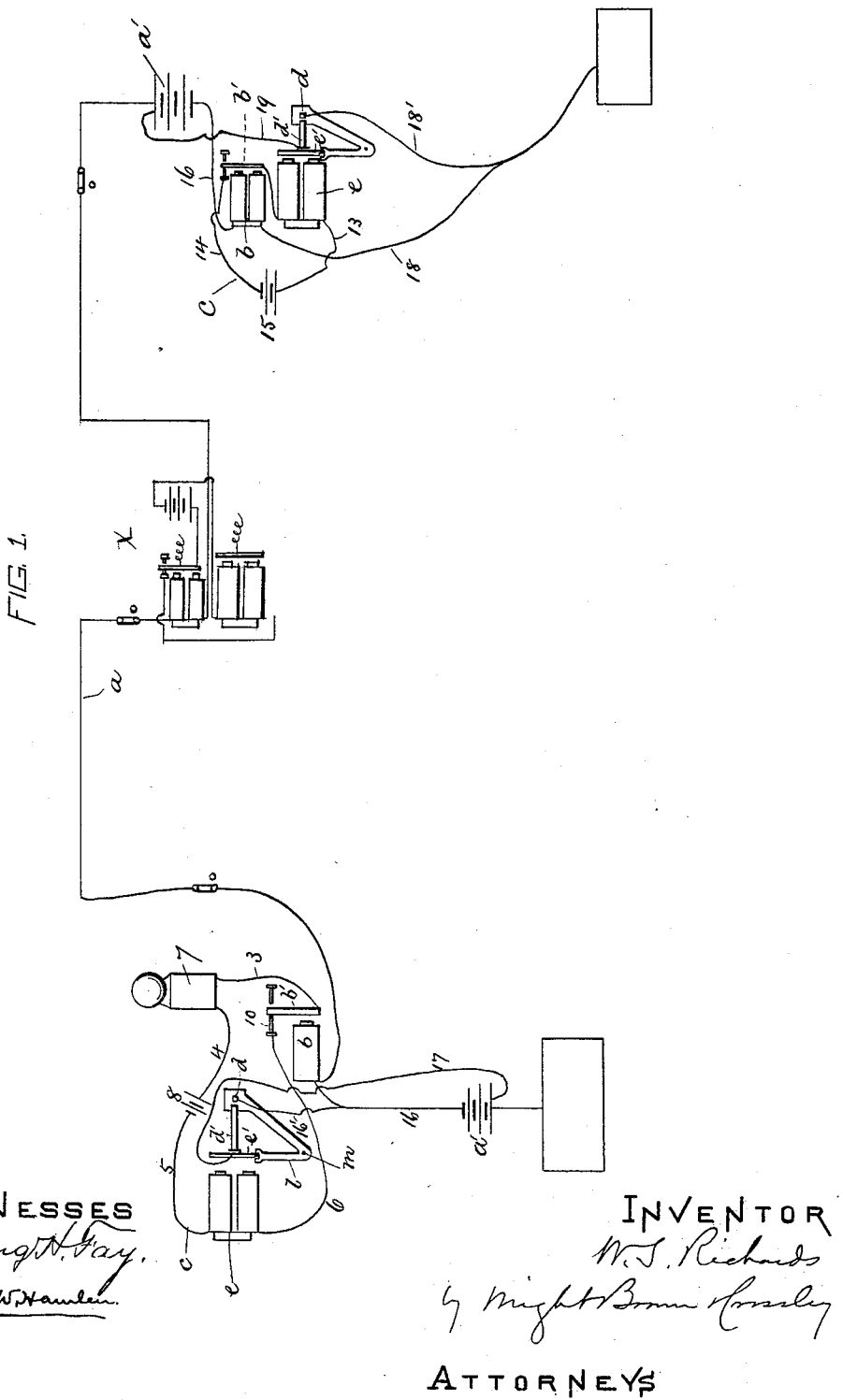
Figure 2:
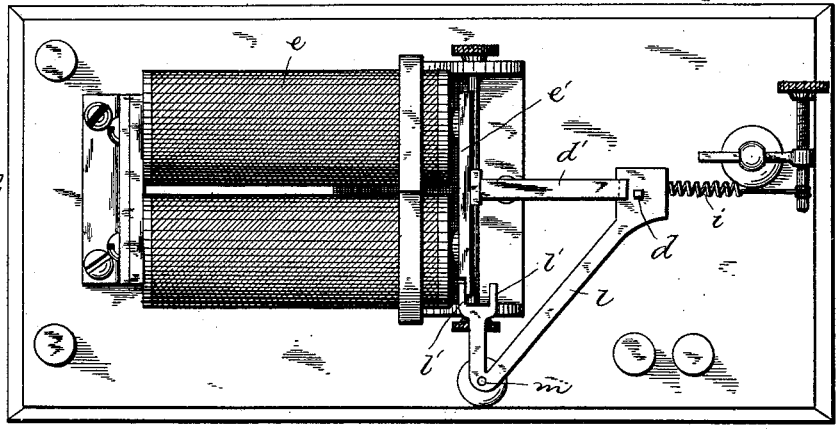
Figure 3:
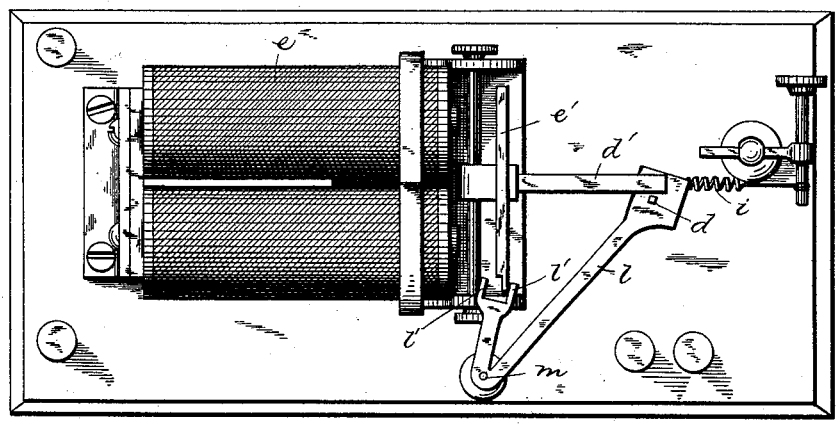
Figure 4:
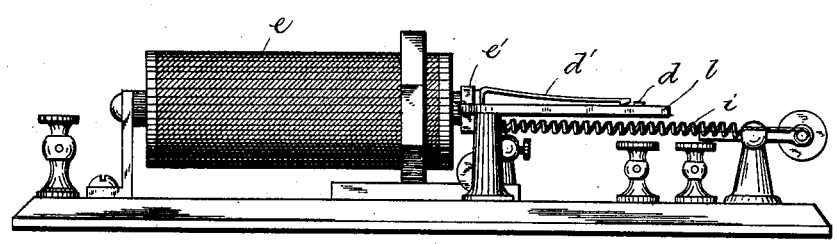

In the accompanying drawings, forming a part of this specification, Figure 1 represents a diagrammatic view of a line provided with my improvements. Figs. 2 and 3 represent top views of the apparatus used in carrying out my invention, and Fig. 4 represents a side elevation of said apparatus.

The same letters and numerals of reference indicate the same parts in all the figures.

In the drawings, $a$ represents the main-line wire of an electric circuit having one or more intermediate relay-stations, one such being indicated at X in Fig. 1.

$b$ $b$ represent relays connected with the ends of the main line, the armature $b'$ of each relay being included in a local circuit, as usual. In the diagram shown in Fig. 1 two end relays and local circuits are shown, one including wires 3 4 5 6, a signal-bell 7, and a local battery 8, the wire 3 at one end of the local circuit being connected with the armature $b'$, while the wire 6 at the other end of said circuit is connected with the armature through a contact-screw 10. The other local circuit $c$ includes the wires 13 and 14 and local battery 15. It is obvious that the local circuits may be differently arranged and may include any other desired apparatus or instrumentalities, my invention not being limited to the arrangement here shown.

In carrying out my invention I provide in each terminal local circuit a device adapted to short-circuit the adjacent main-line battery or other equivalent generator $a'$ whenever the line-circuit is opened. One pole of each battery $a'$ is connected with the corresponding relay by a wire 16, and is also connected with one of two contacts or terminals, which are adapted to be brought together and separated. The other pole of the battery is connected with the other of said pair of contacts, the connections being such that when said contacts are brought together the corresponding battery $a'$ will be short-circuited and the current entirely removed from the line. The said contacts are shown as composed of a block or projection $d$, connected with the negative pole of the corresponding main-line battery, and a wiping spring or finger $d'$, adapted to bear upon the contact $d$. The connections which establish the short circuit when the said contacts are brought together are shown at one of the stations or local circuits as composed of the wire 16 and a branch 16' thereof, connecting the negative pole of the battery $a'$ with the terminal $d$, and a wire 17, connecting the other pole of the battery with the terminal $d'$. The connections for the same purpose at the other station or local circuit between the negative pole of the battery and the contact $d$ are the wire 16, a wire 18, connected with the wire 16 through an electro-magnet $b$, the purpose of which is hereinafter described, and extending to ground, and a branch 18' of wire 18 extending to the terminal $d$. The positive pole of the battery is connected with the terminal $d'$ by a wire 19. These arrangements and connections are not arbitrary and the terminals $d$ $d'$ may be connected to the respective poles of the corresponding battery by any other suitably-arranged connections.

The preferred means whereby the terminals or contacts $d$ $d'$ are brought together by the opening of the main-line circuit are as follows: In each local circuit is placed an electro-magnet $e$, to the armature $e'$ of which the contact $d'$ is attached, said contact being therefore moved back and forth by the attraction of the armature to the poles of the magnet $e$ when the circuit is closed and the retraction of the armature by its retracting-spring $i$ when the circuit is opened. The other contact $d$ is attached to one arm of a bell-crank lever $l$, which is pivoted at $m$ to a fixed support and has its other arm engaged with the armature $e'$, by means of two studs $l'$ $l'$, arranged at opposite sides of said armature and separated by a space in which the armature is adapted to play or have a lost motion, the arrangement being such that when the armature is attracted to the poles of the magnet, as shown in Fig. 1, it will bear on one of the studs $l'$ and hold the lever $l$ in such position that the contact $d$ is close to but does not touch the contact $d'$. When the armature is retracted, its lost motion between the studs $l'$ $l'$ permits the contact $d'$ to touch the contact $d$, and thus momentarily short-circuit the battery $a'$, the armature during the continuation of its retracting movement striking the other stud $l'$ and throwing the lever $l$ to the position shown in Fig. 2, so that the contact $d$ is separated from $d'$, thus breaking the short circuit through the battery $a'$.

It will be seen from the foregoing that at each opening of the main circuit the main-line batteries or generators are briefly short-circuited, so that the current is entirely removed from the main line and the release or separation of the armatures of the intermediate relays from their poles is insured.

It often happens in lines as ordinarily arranged without the described provision of short-circuiting the batteries or generators that the armatures of the relays do not fall away or separate from the poles thereof, but are held in contact with the said poles in consequence of a "weather-cross" on the line or from any other like disturbance, which prevents the proper release of said armatures. Such a result is highly detrimental to the proper working of the line and is entirely prevented by my improvement.

I claim—

1. In a telegraph, the combination of a line-circuit, a battery or equivalent generator connected therewith, and two relatively movable terminals or contacts connected with the generator and reacting upon each other, with a magnet in a local circuit controlling one of said contacts directly and the other contact by the reaction of the first, and devices in the main line for controlling the local circuit, whereby upon the opening of the main line the reacting contacts will momentarily short-circuit the generator without removing the same from the line, substantially as described.

2. In a telegraph, the combination of a line-circuit, a battery or equivalent generator connected therewith, two relatively movable terminals or contacts connected with the poles of the generator, with a local circuit controlled by the main line and a circuit-controller controlled by the local circuit, actuating to separate the said contacts by the closing of the local circuit and to momentarily close the said contacts and then separate them again when the local circuit is opened, substantially as described.

3. In a telegraph, the combination of a line-circuit, a battery or equivalent generator connected therewith, two relatively movable terminals or contacts and connections between the same and the poles of the generator, whereby the generator is short-circuited when the contacts are brought together, with a local circuit controlled by the main line, an electro-magnet in the local circuit, and mechanical connections between the armature of said magnet and the said contacts, whereby the movement of said armature toward the magnet acts to separate the contacts, while its return movement acts to first bring together and then separate the contacts, substantially as described.

4. The combination of the electro-magnet, its armature, a retracting spring for the latter, a bell-crank lever loosely engaged with said armature and having a contact or terminal and arranged to momentarily engage another contact or terminal secured to the armature, as set forth.

5. The combination of the electro-magnet, its armature, and armature-retracting spring, a bell-crank lever having studs arranged to permit lost motion of the armature between them, a contact $d$, attached to said lever, and a contact $d'$, attached to the armature, as set forth.

In testimony whereof I have signed my name to this specification, in the presence of two subscribing witnesses, this 1st day of January, A. D. 1891.

WALTER S. RICHARDS.

Witnesses:
C. F. BROWN,
EWING W. HAMLEN.